Feb. 20, 1968  L. A. GODSCHALK, JR  3,369,713
DEVICE FOR DISPENSING MEASURED QUANTITIES OF LIQUID
Filed April 8, 1966  3 Sheets-Sheet 1
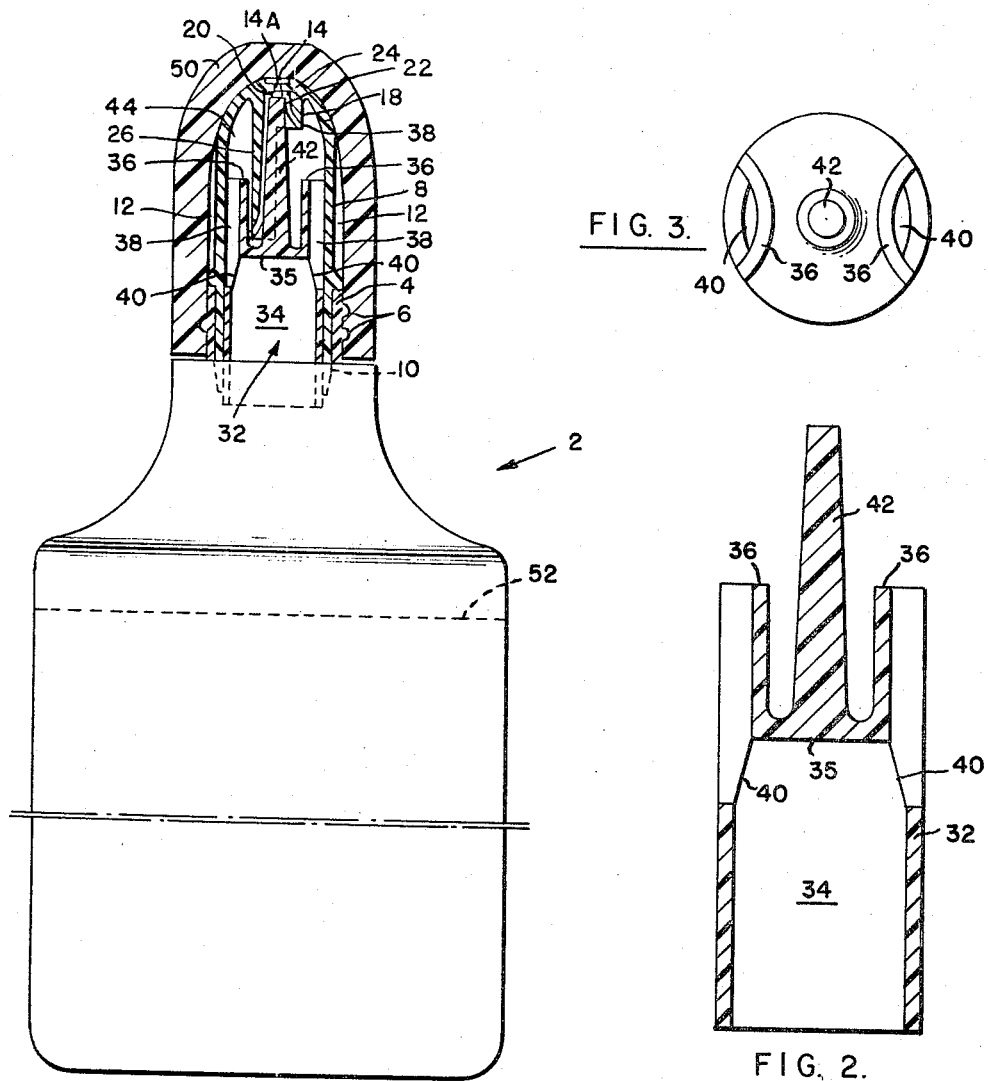
FIG. 3.
FIG. 2.
FIG. 1.
FIG. 4.
INVENTOR
LOUIS A. GODSCHALK, Jr.
BY 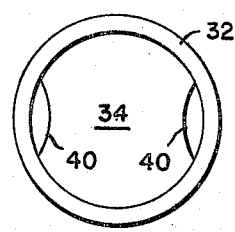
ATTORNEYS Feb. 20, 1968  L. A. GODSCHALK, JR  3,369,713
DEVICE FOR DISPENSING MEASURED QUANTITIES OF LIQUID
Filed April 8, 1966  3 Sheets-Sheet 3

INVENTOR
LOUIS A. GODSCHALK, Jr.
BY Brasser Smith & Hardy

ATTORNEYS

United States Patent Office 3,369,713
Patented Feb. 20, 1968

3,369,713
DEVICE FOR DISPENSING MEASURED QUANTITIES OF LIQUID
Louis A. Godschalk, Jr., Radnor, Pa., assignor to Smith Kline & French Laboratories, Philadelphia, Pa., a corporation of Pennsylvania
Filed Apr. 8, 1966, Ser. No. 541,252
4 Claims. (Cl. 222—193)

This invention relates to a device for dispensing measured quantities of liquid.

It is frequently desired to dispense a measured quantity of liquid. A typical example is in the case of the administration of a nasal decongestant into the nose. This, of course, can readily be accomplished with a dropper. However, the use of a dropper is awkward particularly away from home and further it is advantageous in many cases such as in the case of a nasal decongestant to dispense liquid in the form of a mist or spray.

In accordance with this invention there is provided a container having a dispensing closure whereby a quantity of liquid can first be measured and then dispensed if desired as a spray or a mist by squeezing the container.

In accordance with the invention, the container has at least one flexible wall. Advantageously the container will be formed from a resilient material such as is commonly employed to form so-called "squeeze bottles." Polyethylene and polypropylene are exemplary. The container is provided with a discharge opening to which is secured a dispensing closure. The closure comprises a cap having a plug in the lower portion thereof to form a chamber for liquid to be dispensed. The closure has means forming a passage for the movement of liquid from the container into the chamber and preventing a predetermined amount of the liquid transferred to the chamber from returning to the container. Generally this will be all or, at least a major portion of the liquid transferred from the container to the chamber. The arrangement is such that when the desired liquid has been placed in the chamber it can be forced out through the dispensing opening by squeezing the container.

The invention and its objects will be clarified from a reading of the following description in conjunction with the drawings in which:

FIGURE 1 is a front elevation of a container in accordance with the invention, partially broken away, to show the closure;

FIGURE 2 is a vertical section through the plug of the closure shown in FIGURE 1;

FIGURE 3 is a top plan view of the plug of FIGURE 2;

FIGURE 4 is a bottom plan view of the plug of FIGURE 2;

Figure 5:
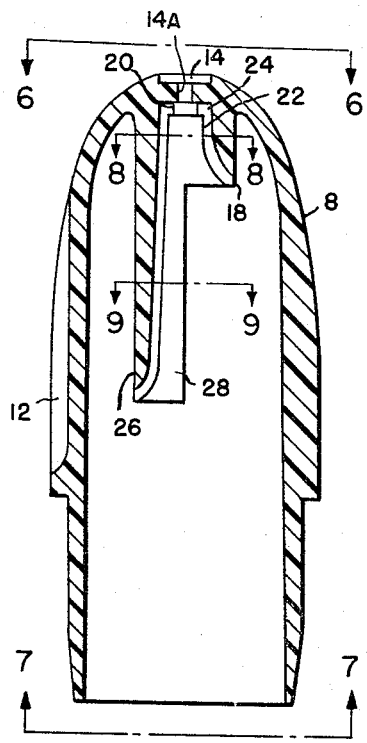
FIGURE 5 is a vertical section through the inner cap of the closure of the container of FIGURE 1.
Figure 6:
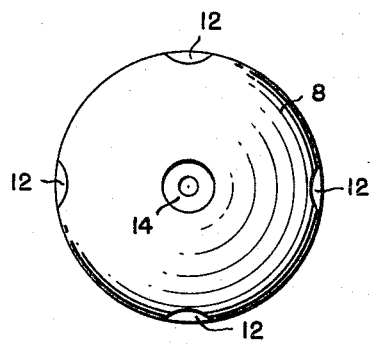
FIGURE 6 is a top plan view of the inner cap of FIGURE 5.
Figure 7:
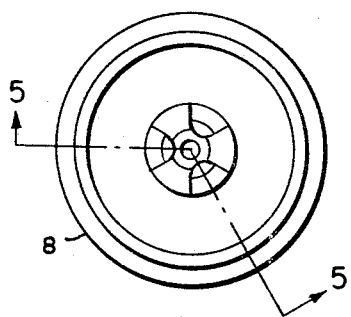
FIGURE 7 is a bottom plan view of the inner cap of FIGURE 5.
Figure 8:
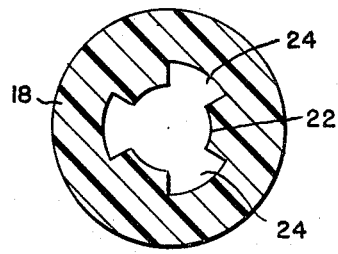
FIGURE 8 is a horizontal section taken on the plane indicated by the line 8—8 in FIGURE 5.
Figure 9:
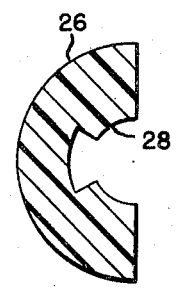
FIGURE 9 is a horizontal section taken on the plane indicated by the line 9—9 in FIGURE 5.

Referring to FIGURE 1 a container 2 in accordance with the invention is formed of a resilient synthetic resin such as polyethylene and is provided with a neck 4 which is externally threaded as indicated at 6. An inner cap 8 has a reduced bottom portion 10 which fits tightly within neck 4.

Cap 8 is shaped especially for use as a nose piece for the administration of a metered dose to the nose and is provided with fluted portions 12. The top of the cap 8 is provided with a dispensing opening 14 which has a restricted portion 14A.

Cap 8 has an inwardly extending central boss 18 having a reduced bore 20 communicating with opening 14 and an enlarged bore 22. Adjacent bores 20 and 22 there is provided a plurality of radially recessed portions 24. Boss 18 has an extension portion 26, the inner portion 28 thereof forming a portion of a frustum.

A plug 32 fits tightly within the lower portion of cap 8 and has a hollow lower portion 34 and a transverse wall 35. Plug 32 has a pair of partition members 36, 36 extending upwardly from wall 35 to form, with cap member 8, passages 38 communicating through openings 40 with the hollow portion 34.

Plug 32 has an upstanding boss 42 having a frustum shape. Boss 42 is complementary in shape to but spaced from extension portion 26 of boss 18. Boss 42 extends upwardly into bore 22 of boss 18 and is prevented from entering bore 20 since its upper end is of a greater diameter than bore 20.

Plug 32 together wtih cap 8 form a chamber 44 for liquid to be dispensed. An outer closure cap 50 may be threaded to threads 6 to engage the top of inner cap 8 and seal off opening 14.

OPERATION

The container will be filled with a liquid, for example, a nasal decongestant to a level indicated at 52 to leave a substantial air space below the neck of the container. The container having been properly filled, the preassembled inner cap 8 and plug 32 are inserted into position in container neck 4. Outer cap 50 may then be secured to threads 6. For use, outer cap 50 is removed. The container 2 is then inverted permitting liquid to flow into the hollow portion 34 of plug 32 through openings 40, the passages 38 formed between partition members 36 and inner cap 8 into chamber 44. The liquid is prevented from flowing out of the container by the restricted portion 14A of opening 14 due to surface tension and by virtue of the negative pressure or vacuum created by the flow of liquid out of container 2 into chamber 44. The container 2 is then placed in an upright position permitting the liquid in chamber 44 to flow back into container 2 except that which is contained between partition members 36 thus accurately determining the amount of liquid to be dispensed. On squeezing the resilient container 2 air is forced upwardly through openings 40 and the passages 38 and into chamber 44 to force the liquid which was transferred to chamber 44 through the passages between bosses 42 and 18 and thence through opening 14 in the form of a spray or mist. A number of squeezes may be necessary to dispense all of the measured liquid, but in any event an accurately measured amount will be dispensed.

ALTERNATIVE EMBODIMENTS

Figure 10:
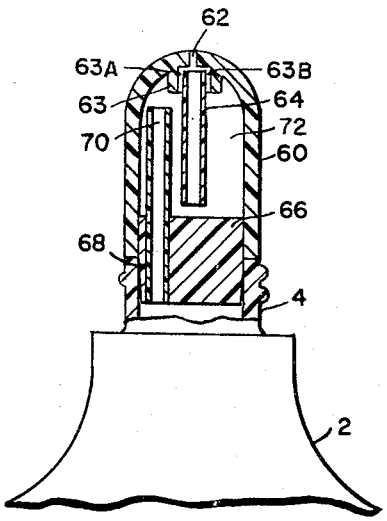
FIGURE 10 is a front elevation, partially broken away, of a container in accordance with the invention having an alternative closure.

Alternative embodiments are shown in FIGURES 10 through 13. Referring to FIGURE 10, an inner cap 60 has a restricted opening 62 below which depends a hollow boss 63 in which is secured a downwardly extending tube 64. Boss 63 has a pair of grooves 63A and 63B. A plug 66 is secured in the lower portion of cap 60 and has an opening 68 in which is secured an upwardly extending tube 70. Plug 66 is secured in the neck 4 of a container 2.

Cap 60 and plug 66 form a chamber 72 which is filled with liquid when container 2 is inverted, restricted opening 62 and negative pressure in the container 2 preventing the flow of liquid through opening 62. When the container 2 is again erected the chamber 72 will remain filled with liquid up to the top of tube 70. On squeezing the container 2 the liquid in chamber 72 is dispensed upwardly through tube 64 which facilitates liquid pick up and air passes through grooves 63A and 63B to assist in forming a spray.

Figure 11:
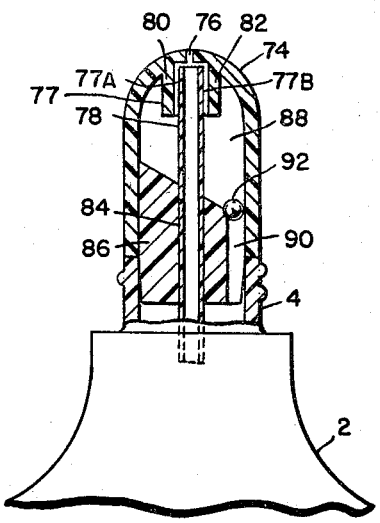
FIGURE 11 is a front elevation, partially broken away, of a container of the invention having an alternative closure.
Figure 13:
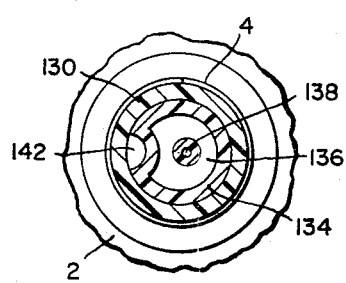
FIGURE 13 is a horizontal section taken on the plane indicated by the line 13—13 in FIGURE 12.

As shown in FIGURE 11, an inner cap 74 has a restricted opening 76 below which depends a hollow boss 77 in which is secured a downwardly extending tube 78 which extends below cap 74. Boss 77 has a pair of grooves 77A and 77B. Tube 78 extends downwardly through an opening 84 in a plug 86 secured in the lower portion of cap 74. Plug 86 is secured tightly in the neck 4 of a container 2. Plug 86 together with cap 74 forms a chamber 88 which is connected to container 2 by a passage formed by a recessed portion 90 of plug 86 together with cap 74 and neck 4 of container 2. A ball check valve 92 is provided to coact with this passage.

In operation the container 2 is inverted and liquid flows through the passage formed between recessed portion 90 and neck 4 and cap 74 into chamber 88 while replacement air flows into container 2 through tube 78. Opening 76 is sufficiently small so as to prevent the outflow of liquid therethrough under the existing pressure conditions. The container is then righted and ball check valve 92 closes off the passage 90 preventing the return flow of liquid to the container 2. On squeezing the container air under pressure is forced through tube 78 and through the passage formed between the recessed portion 90 of plug 86 and neck 4 and cap 74 to force liquid contained in measuring chamber 88 through openings 77A and 77B where it is entrained by the air passing through tube 78 and passes through opening 76 as a spray.

Figure 12:
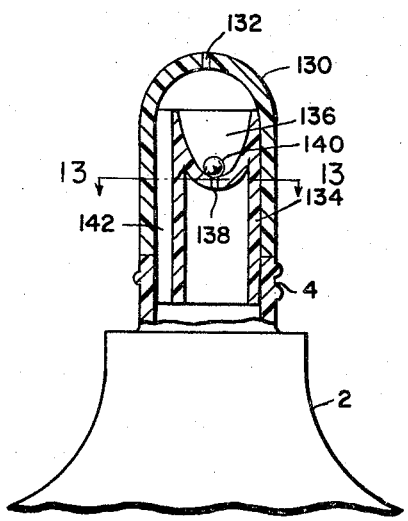
FIGURE 12 is a front elevation of a container of the invention, partially broken away, having an alternative closure.

Referring to FIGURE 12 an inner cap 130 has a restricted discharge opening 132. A plug member 134 is secured within cap 130. Plug member 134 has a well portion 136 having a downwardly extending opening 138 and a ball check valve 140. A recessed portion 142 of plug 134 provides together with cap 130 and neck 4 a passage between container 2 and well portion 136. On being inverted liquid flows through this passage from container 2 into the upper portion of cap 130, the restricted opening 132 and negative pressure preventing the flow of liquid through opening 132. If it is desired to use a large opening 132, ball check valve 140 will block the flow of liquid through opening 132. When the container is again righted the well portion 136 will remain full of liquid with ball check valve 140 preventing the flow of liquid downwardly through opening 138. On squeezing the container 2 air is forced upwardly through opening 138 and upwardly through the passage between the recessed portion 142 and neck 4 and cap 130 to force the liquid out through the restricted opening 132.

It will be understood that the above embodiments are illustrative and not limiting.

What is claimed is:

1. A device for dispensing measured quantities of liquid comprising:
 a container having at least one resilient wall and a discharge opening,
 a dispensing closure for said container opening,
 said closure having a dispensing opening in the top thereof and a chamber for liquid to be dispensed,
 means forming a passage for the movement of liquid from the container into the chamber when the container is inverted and preventing the return of a predetermined amount of liquid when the container is righted,
 an upwardly extending boss mounted on the bottom of said chamber,
 a member secured to said closure and extending downwardly in contact with said boss and into the lower portion of said chamber,
 means forming a liquid passage between said member and said boss connecting the dispensing opening and the chamber; and
 means forming an air passage conecting the dispensing opening to the chamber.

2. A device in accordance with claim 1 in which the dispensing opening is restricted to prevent the flow of liquid therethrough when the device is inverted.

3. A device for dispensing measured quantities of liquid comprising:
 a container having at least one resilient wall and a discharge opening,
 a dispensing closure for said container opening,
 said closure having a dispensing opening in the top thereof and a chamber for liquid to be dispensed,
 means forming a passage for the movement of liquid from the container into the chamber when the container is inverted and preventing the return of a predetermined amount of liquid when the container is righted, the upper end of said passage terminating at the bottom of the chamber; and
 valve means to block the downward flow of liquid in the passage when the device is upright.

4. A device in accordance with claim 3 having means forming a passage between the dispensing opening and the container and means forming a passage between the chamber and the dispensing opening.

References Cited

UNITED STATES PATENTS

| 2,879,924 | 3/1959 | Bacheller | 222—207 |
| 2,979,236 | 4/1961 | Fahr | 222—212 X |
| 2,989,215 | 6/1961 | Willingham | 222—207 |
| 3,128,919 | 4/1964 | Baxter | 222—207 |
| 3,141,579 | 7/1964 | Medlock | 222—207 |
| 3,176,883 | 4/1965 | Davis | 222—212 X |

ROBERT B. REEVES, *Primary Examiner.*

F. R. HANDREN, *Assistant Examiner.*